(12) United States Patent
Baek et al.

(10) Patent No.: US 9,099,695 B2
(45) Date of Patent: Aug. 4, 2015

(54) BATTERY PACK WITH REINFORCED COUPLING MEMBER

(75) Inventors: Woon-Seong Baek, Yongin-si (KR); Won-Ho Kim, Yongin-si (KR); Heui-Sang Yoon, Yongin-si (KR)

(73) Assignee: Samsung SDI Co., Ltd., Yongin, Gyeonggi-do (KR)

( * ) Notice: Subject to any disclaimer, the term of this patent is extended or adjusted under 35 U.S.C. 154(b) by 628 days.

(21) Appl. No.: 12/854,806

(22) Filed: Aug. 11, 2010

(65) Prior Publication Data

US 2011/0123837 A1 May 26, 2011

(30) Foreign Application Priority Data

Nov. 24, 2009 (KR) .................. 10-2009-0113937

(51) Int. Cl.
| | | |
|---|---|---|
| *H01M 12/00* | (2006.01) | |
| *H01M 2/04* | (2006.01) | |
| *H01M 2/06* | (2006.01) | |
| *H01M 2/22* | (2006.01) | |
| *H01M 2/30* | (2006.01) | |
| *H01M 10/04* | (2006.01) | |
| *H01M 2/02* | (2006.01) | |
| *H01M 10/0525* | (2010.01) | |

(52) U.S. Cl.
CPC .......... *H01M 2/0404* (2013.01); *H01M 2/0257* (2013.01); *H01M 2/06* (2013.01); *H01M 2/22* (2013.01); *H01M 2/30* (2013.01); *H01M 10/0436* (2013.01); *H01M 2/0207* (2013.01); *H01M 2/0217* (2013.01); *H01M 10/0525* (2013.01); *H01M 2200/106* (2013.01)

(58) Field of Classification Search
CPC .......................... H01M 2/0404; H01M 2/0257
USPC ................................ 429/7, 163, 167, 175, 177
See application file for complete search history.

(56) References Cited

U.S. PATENT DOCUMENTS

| | | | |
|---|---|---|---|
| 2008/0233472 A1* | 9/2008 | Ota et al. | ............... 429/122 |
| 2009/0186268 A1 | 7/2009 | Song | |

FOREIGN PATENT DOCUMENTS

| | | |
|---|---|---|
| JP | 08-273656 A | 10/1996 |
| JP | 2006-147193 | 6/2006 |

(Continued)

OTHER PUBLICATIONS

D.B. Roberts Company, Fastener Reference Guide, Mar. 5, 2005. Retrieved Sep. 5, 2012 from Wayback Machine, Web Site: http://www.dbroberts.com/dbroberts_fastener_guide.pdf.*

(Continued)

*Primary Examiner* — Milton I Cano
*Assistant Examiner* — Jimmy K Vo
(74) *Attorney, Agent, or Firm* — Knobbe Martens Olson & Bear LLP

(57) ABSTRACT

The battery pack comprises: a bare cell including a can, wherein the can includes an opening on one side, and a cap plate sealing the opening of the can, wherein the cap plate has at least one groove formed on one surface; a circuit board including at least one lead tab. wherein the lead tab is coupled to the cap plate by a fixing body; and a coupling member coupled with the fixing body in the groove. The coupling member and the bare cell are made of different materials. Therefore, in the battery pack, the internal resistance between the bare cell and the protective circuit board does not increase, or the cover case is not separated when an external shock is applied.

15 Claims, 5 Drawing Sheets

(56) References Cited

FOREIGN PATENT DOCUMENTS

| | | | |
|---|---|---|---|
| JP | 2006147193 A | * | 6/2006 |
| JP | 2006-331648 | | 12/2006 |
| KR | 10-2000-0073824 | | 12/2000 |
| KR | 2008-0013212 A | | 2/2008 |
| KR | 10-2009-0063846 | | 6/2009 |
| KR | 10-2009-0078181 | | 7/2009 |

OTHER PUBLICATIONS

Korean Office Action dated Mar. 28, 2011 in corresponding application No. 10-2009-0113937.

Office Action dated Oct. 26, 2011 for corresponding Korean Application No. 10-2009-0113937.

* cited by examiner

Prior art

BATTERY PACK WITH REINFORCED COUPLING MEMBER

CROSS-REFERENCE TO RELATED APPLICATIONS

This application claims priority to and the benefit of Korean Patent Application No. 10-2009-0113937, filed on Nov. 24, 2009, in the Korean Intellectual Property Office, the entire content of which is incorporated herein by reference.

BACKGROUND

1. Field

Embodiment of the present invention relate to a battery pack, and more particularly, to a battery pack in which increases in internal resistance or failures such as the separation of the cover case of a battery pack are not caused due to external shocks.

2. Description of the Related Technology

Compact and light portable electronic devices such as a cellular phones, laptop computers, and camcorders have been actively developed and produced in recent years. Battery packs are typically mounted in the portable electronic devices so that the portable electronic devices operate even in places where an additional power source is not provided. In consideration of an economic aspect, the battery pack recently adopts a chargeable and dischargeable secondary battery.

Typical secondary batteries include nickel-cadmium (Ni—Cd) batteries, nickel-hydrogen (Ni-MH) batteries, lithium (Li) batteries, and lithium ion (Li-ion) batteries. In particular, the operation voltage of the lithium ion secondary battery is typically three times higher than the operation voltage of the Ni—Cd battery and the Ni-MH battery that are used as equipment power sources. In addition, the lithium ion secondary battery is widely used since energy density per unit weight is high.

SUMMARY

Embodiments of the present invention provide a battery pack in which internal resistance does not increase, or the cover case of a battery pack is not separated when external shock is applied to a bare cell and a protective circuit board. Embodiments of the present invention thus provide improvements to the assembly and reliability of a battery pack.

According to an embodiment of the present invention, a battery pack comprises a bare cell including a can, wherein the can includes an opening on one side, and a cap plate sealing the opening of the can, wherein the cap plate has at least one groove formed on one surface; a circuit board including at least one lead tab, wherein the lead tab is coupled to the cap plate by a fixing body; and a coupling member coupled with the fixing body in the groove. The coupling member and the bare cell are made of different materials.

According to an embodiment, the coupling member is made of a material having higher mechanical strength than that of aluminum. According to an embodiment, the coupling member is made of nickel.

According to an embodiment, the groove formed in the cap plate includes a first groove and a second groove. The fixing body includes a first fixing body coupled to the first groove and a second fixing body coupled to the second groove. The coupling member includes a first coupling member coupled to the first fixing body and a second coupling member coupled to the second fixing body.

According to an embodiment, the coupling member includes a head unit and a rod unit extended from the head unit. The coupling member is coupled so that the head unit contacts the lower surface of the cap plate and that the rod unit is coupled to pass through the cap plate.

According to an embodiment, the rod unit includes a groove opened upward to be coupled to the fixing body. The lower diameter of the rod unit is larger than the upper diameter.

According to an embodiment, the fixing body is a screw bolt. Sealing members are formed on both sides of the opening of the cap plate to seal up the coupling member.

According to an embodiment, a battery pack comprises a bare cell including a can and a cap plate, and a circuit board including a lead tab, wherein the lead tab is coupled to the cap plate by a fixing body. The cap plate includes a coupling member in a region where the fixing body is coupled to the cap plate, and the cap plate and the coupling member are made of different materials.

According to an embodiment, the coupling unit is made of a material having higher mechanical strength than aluminum. According to an embodiment, the coupling unit is made of nickel.

According to an embodiment, the fixing body comprises a first fixing body and a second fixing body, and the coupling unit comprises a first coupling unit coupled to the first fixing body and a second coupling unit coupled to the second fixing body.

According to an embodiment, the coupling unit comprises a head unit and a rod unit extended from the head unit.

According to an embodiment, the coupling unit is inserted from a lower part to an upper part of the cap plate and sealed such that the coupling unit does not protrude to an exterior of the cap plate.

According to an embodiment, the rod unit comprises a groove opened to be coupled to the fixing body. The lower diameter of the rod unit is larger than the upper diameter.

According to an embodiment, the fixing body is a screw bolt.

BRIEF DESCRIPTION OF THE DRAWINGS

The accompanying drawings illustrate embodiments of the present invention, and with their corresponding descriptions in the specification, serve to explain principles of embodiments the present invention.

DETAILED DESCRIPTION

Figure 1:
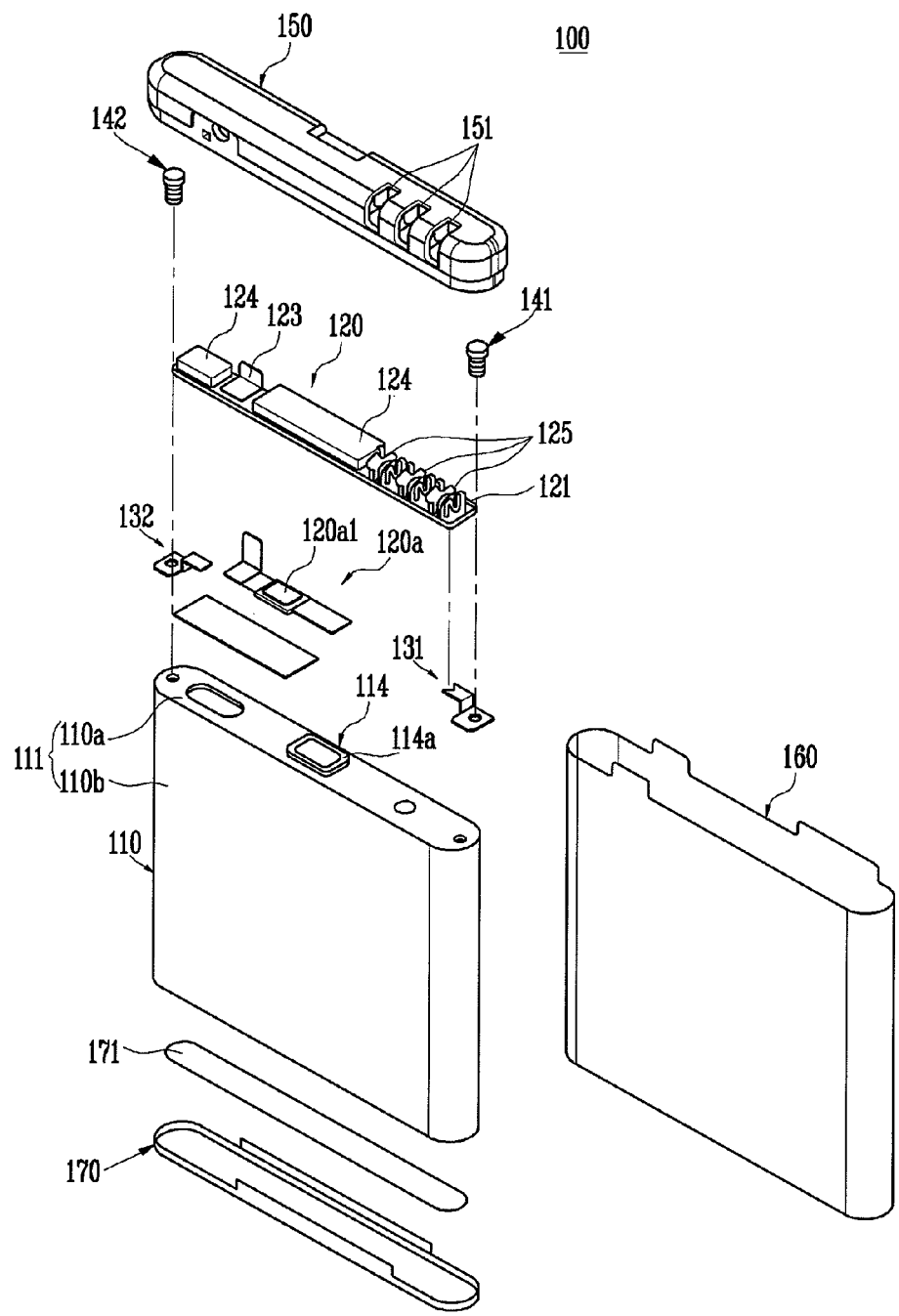
FIG. 1 is an exploded perspective view of a battery pack according to an embodiment of the present invention.

In the following detailed description, only certain embodiments of the present invention have been shown and described simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as "on" another element, it can be directly on another element or be indirectly on another element with one or more intervening elements interposed therebetween. Also, when an element is referred to as "connected to" another element, it can be directly connected to another element or be indirectly connected to another element with one or more intervening elements interposed therebetween. Hereinafter, like reference numerals refer to like elements.

Hereinafter, embodiments of the present invention will be described in detail with reference to the accompanying drawings. In the following embodiments, like reference numerals refer to like elements and description of the same elements will be omitted.

Figure 2:
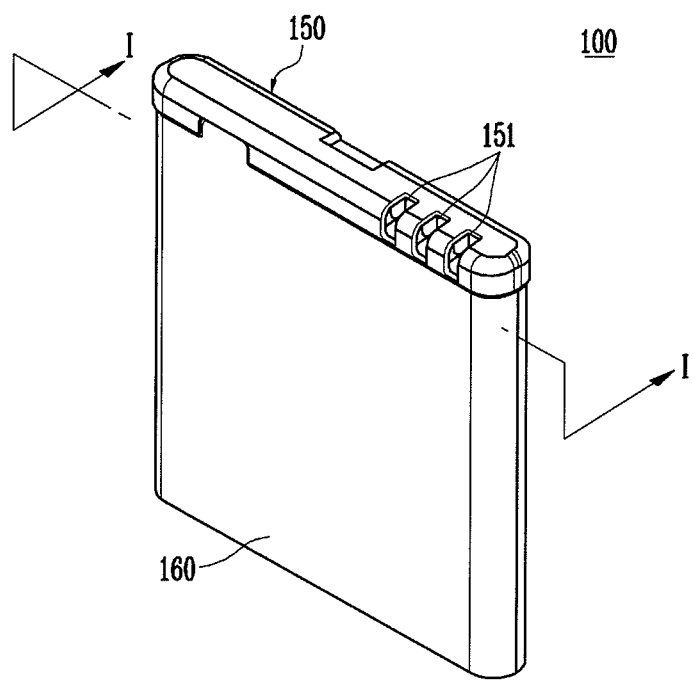
FIG. 2 is a perspective view illustrating that the battery pack of FIG. 1 is coupled.
Figure 3:
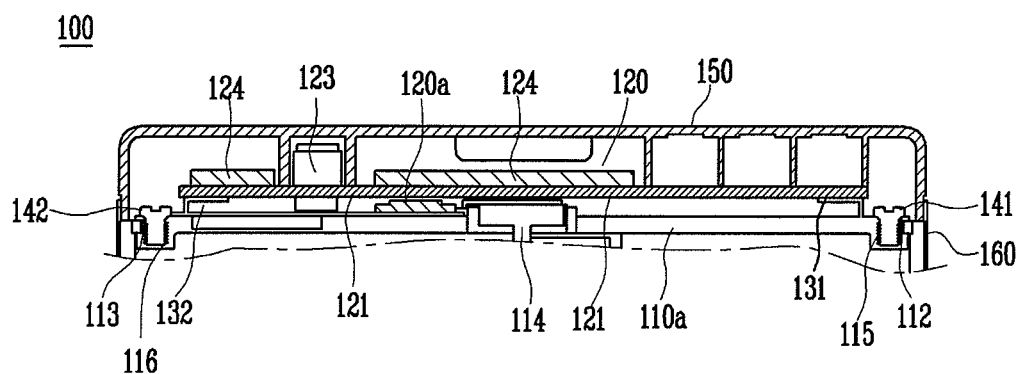
FIG. 3 is a partial sectional view taken along the line I-I of the battery pack of FIG. 2.
Figure 4:
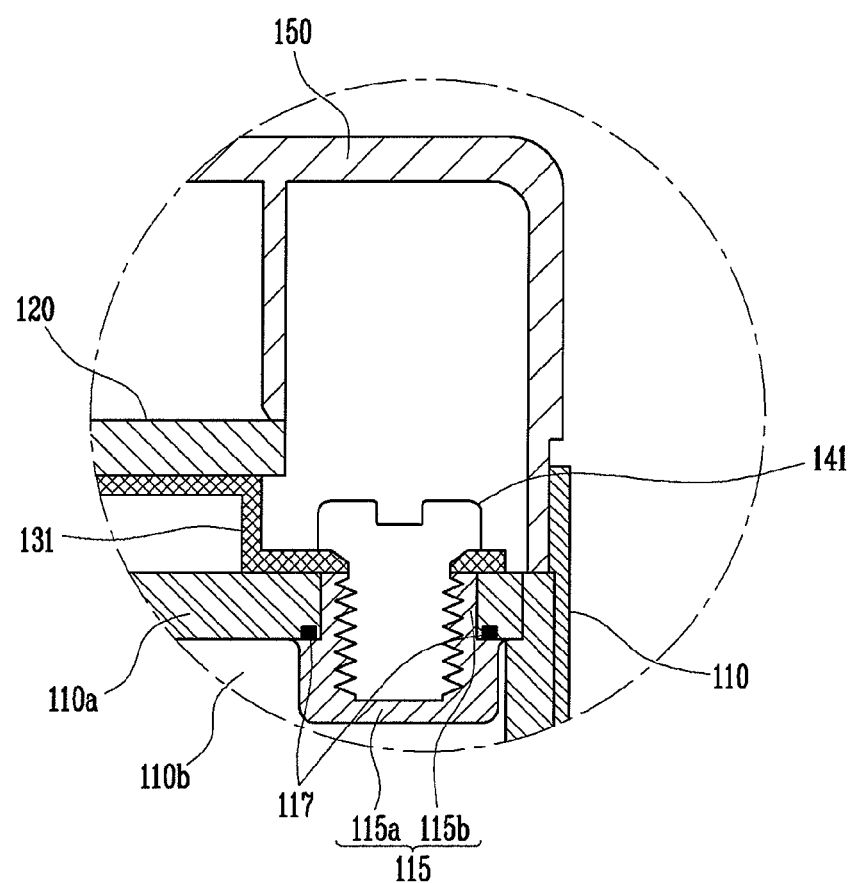
FIG. 4 is a sectional view illustrating an enlarged periphery of the fixing body of FIG. 3.
Figure 5:
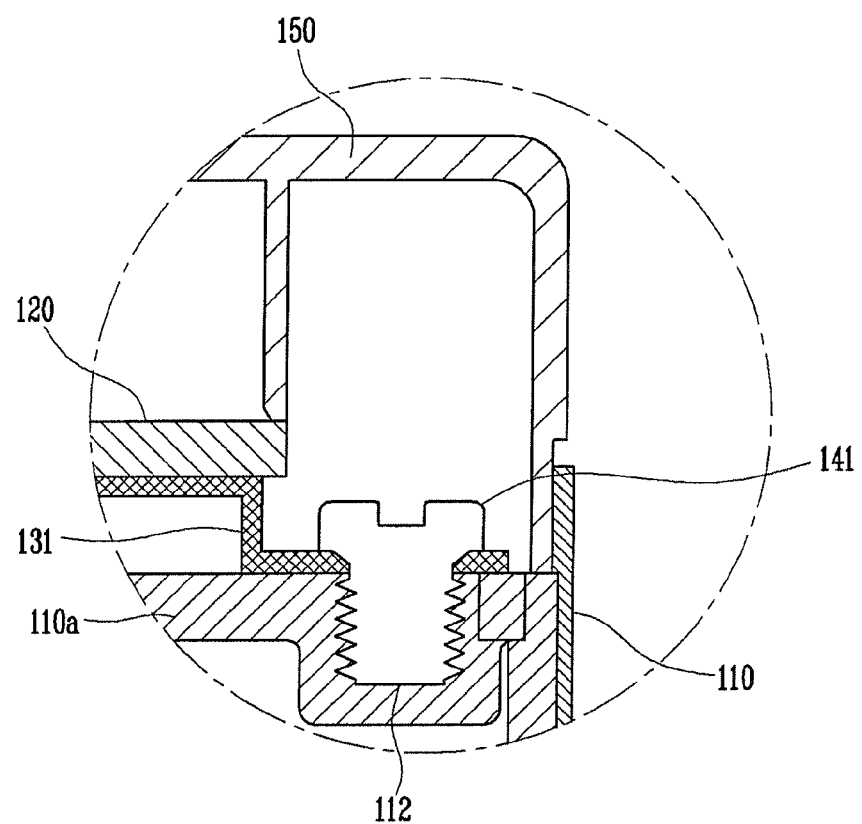
FIG. 5 is a sectional view of a comparative example to be compared with FIG. 4.

FIG. 1 is an exploded perspective view of a battery pack according to an embodiment of the present invention. FIG. 2 is a perspective view illustrating that the battery pack of FIG. 1 is coupled. FIG. 3 is a partial sectional view taken along the line I-I of the battery pack of FIG. 2. FIG. 4 is a sectional view illustrating an enlarged periphery of the fixing body of FIG. 3. FIG. 5 is a sectional view of a comparative example to be compared with FIG. 4.

As illustrated in FIGS. 1 to 5, a battery pack 100 according to an embodiment of the present invention may include a bare cell 110, a protective circuit board 120, and coupling members 115 and 116. According to the present embodiment, metal lead tabs 131 and 132 will be described as a first metal lead tab 131 and a second metal lead tab 132. In addition, according to the present embodiment, the coupling members 115 and 116 will be described as a first coupling member 115 and a second coupling member 116. In addition, according to the present embodiment, fixing bodies 141 and 142 will be described as a first fixing body 141 and a second fixing body 142. In addition, coupling grooves 112 and 113 formed in the bare cell 110 will be described as a first coupling groove 112 and a second coupling groove 113.

The bare cell 110 may be a 'can type' battery having a positive polarity P+ and a negative polarity P−. In addition, the first coupling groove 112 and the second coupling groove 113 may be formed on both sides of one surface of an outline. In addition, the first fixing body 141 may be coupled to the first coupling groove 112 and the second fixing body 142 may be coupled to the second coupling groove 113.

On the other hand, the bare cell 110 may be a 'can type' battery obtained by sealing up an electrode assembly (not shown) formed by winding a positive electrode plate (not shown), a negative electrode plate (not shown), and a separator (not shown) by a sealing assembly 111 made of a metal material such as aluminum. The sealing assembly 111 may include a metal can 110b whose one end is opened and a cap plate 110a closing the opening of the can. An electrode terminal 114 may be provided in the metal can 110b and the cap plate 110a to be insulated by an insulating body 114a.

In FIGS. 1 and 3, the electrode terminal 114 is inserted into the cap plate 110a to be insulated by the insulating body 114a. At this time, the positive electrode of the bare cell 110 may be electrically coupled to the sealing assembly 111 and the negative electrode of the bare cell 110 may be electrically coupled to the electrode terminal 114. Here, the bare cell 110 is a can type battery that seals up the electrode assembly by the sealing assembly 111 made of a metal material, that electrically couples one polarity of the polarities of the electrode assembly to the sealing assembly 111, and that couples the other polarity to the electrode terminal 114. According to the present embodiment, the electrode terminal 114 is electrically coupled to the negative electrode plate of the electrode assembly to form a negative pole and the sealing assembly 111 is electrically coupled to the positive electrode plate of the electrode assembly to form a positive pole.

The protective circuit board 120 may be electrically coupled to the bare cell 110. In electrically coupling the protective circuit board 120 and the bare cell 110, the negative pole of the protective circuit board 120 is coupled to the electrode terminal 114 that is the negative pole of the bare cell 110 by the lead tab 120a and the positive pole of the protective circuit board may be electrically coupled to the sealing assembly 111 that is the positive pole of the bare cell 110 by the first metal lead tab 131. At this time, a PTC element 120a1 is electrically coupled between the negative pole of the protective circuit board 120 and the electrode terminal 114 so that, when temperature excessively rises or when over-current flows, electric coupling between the negative electrode of the protective circuit board 120 and the electrode terminal 114 may be intercepted.

In addition, the protective circuit board 120 can include an insulating substrate 121, a printed circuit pattern (not shown), a conductive pad 123, a protective circuit board 124, and a charge and discharge terminal 125. The conductive pad 123, the protective circuit unit 124, and the charge and discharge terminal 125 may be soldered to the printed circuit pattern formed in the insulating substrate 121. Here, a passive element such as a resistor and a condenser, an active element such as a field effect transistor, a safety element such as the PTC element, and integrated circuits may be selectively formed. In addition, the protective circuit unit 124 can charge or discharge the bare cell 110 when the bare cell 110 is charged or discharged and can intercept the charge and discharge path of the bare cell 110 when the bare cell 110 is overheated or over-current flows through the bare cell 110, and thus prevent the life of the bare cell 110 from being reduced, prevent the bare cell 110 from being overheated, and prevent the bare cell 110 from exploding.

One end of each of the first metal lead tab 131 and the second metal lead tab 132 may be coupled to the protective circuit board 120 and the other ends of the first metal lead tab 131 and the second metal lead tab 132 may contact the bare cell 110. The first coupling groove 112 and the second coupling groove 113 of the bare cell 110 may be formed in the surface that contacts the first metal lead tab 131, the second metal lead tab 132, and the bare cell 110. The first metal lead tab 131 and the second metal lead tab 132 may support the protective circuit board 120 to be settled on one surface of the bare cell 110 and may electrically couple the positive pole of the protective circuit board 120 to the bare cell 110.

The first fixing body 141 may be coupled to the first coupling groove 112 of the bare cell 110 through a hole formed in the first metal lead tab 131. The second fixing body 142 may be coupled to the second coupling groove 113 of the bare cell 110 through a hole formed in the second metal lead tab 132. The fixing bodies 141 and 142 may be formed of screw bolts.

On the other hand, the protective circuit board 120 may be wrapped by a cover case 150 to prevent shorting and to be protected against external shock. In addition, the cover case 150 may be hooked or coupled to the protective circuit board 120, and may also be coupled to the protective circuit board 120 by a method such as bonding, attaching, and taping to form a cover case type battery pack. In addition, after the cover case 150 is coupled to the protective circuit board 120, the cover case 150 may be wrapped by a label 160 together with the bare cell 110. At this time, the charge and discharge terminal 125 may be exposed to the outside by a charge and discharge terminal hole 151 formed in the cover case 150.

In addition, the bare cell 110 may be further wrapped by an auxiliary case 170 so that the edge of the bare cell 110 may be protected against external shock. At this time, a double stick tape 171 may be formed between the auxiliary case 170 and the bare cell 110 to couple the auxiliary case 170 with bare cell 110.

The battery pack 100 can prevent internal resistance between the bare cell 110 and the protective circuit board 120 from increasing and can prevent the cover case 150 from being separated although external shock is applied when the metal lead tabs 131 and 132 soldered to the protective circuit board 120 are coupled to the coupling grooves 112 and 113 of the cap plate 110a by the fixing bodies 141 and 142. To be specific, FIG. 5 is a sectional view of a comparative example to be compared with FIG. 4. In FIG. 5, the metal lead tab 131 soldered to the protective circuit board 120 is coupled to the coupling groove 112 of the cap plate 110a by the fixing body 141. As illustrated in FIG. 5, the cap plate 110a to which the fixing body 141 is fastened is made of aluminum that collapses. Because aluminum has weak mechanical properties, it can collapse without withstanding the fastening force to the fixing body 141 when the fixing body 141 is fastened to the coupling groove 112 formed in the cap plate 110a. At this time, when shock is applied to the bare cell 110 from the outside, the fixing body 141 moves so that the fixing body 141 deviates from the cap plate 110a. Such a phenomenon can increase the internal resistance of the battery pack and separate the cover case. Therefore, in order to prevent aluminum from collapsing, as illustrated in FIG. 4, the coupling member 115 coupled to the fixing body 141 may be provided in the region where the cap plate 110a made of aluminum contacts the metal lead tab 131. The coupling member 115 is made of a different material as the bare cell 110, and may be made of a material having higher strength than aluminum, such as nickel. Therefore, the region in which the metal lead tab 131 is coupled to the cap plate 110a by the fixing body 141 may be coupled to the coupling member 115 made of a material having higher strength than aluminum so that the reliability of the battery pack 100 is improved.

In addition, as illustrated in FIG. 4, the coupling member 115 can include a head unit 115a and a rod unit 115b extended from the head unit. The head unit 115a may contact the lower surface of the cap plate 110a and the rod unit 115b may be coupled to pass through the cap plate 110a. In addition, the rod unit 115b may include a groove opened upward to be coupled to the screw bolt. In addition, the lower diameter of the rod unit 115b may be larger than the upper diameter of the rod unit 115b. In addition, a sealing member 117 may be formed on both sides of the opening of the cap plate 110a to seal up the coupling member 115.

Figure 6:
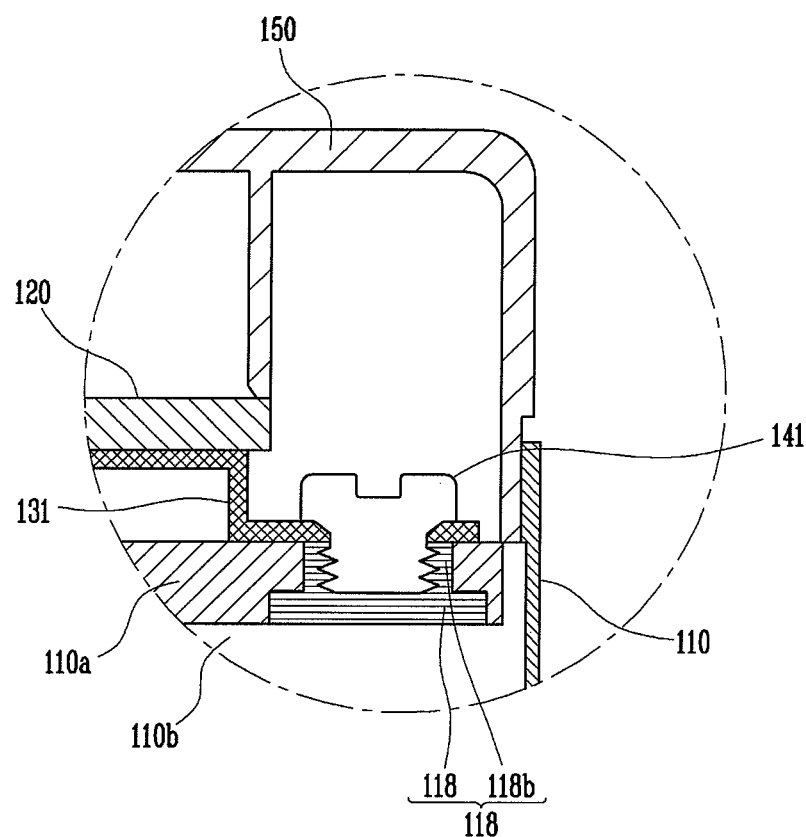
FIG. 6 is a partial sectional view taken along the line I-I of the batter pack according to an embodiment of the present invention.
Figure 7:
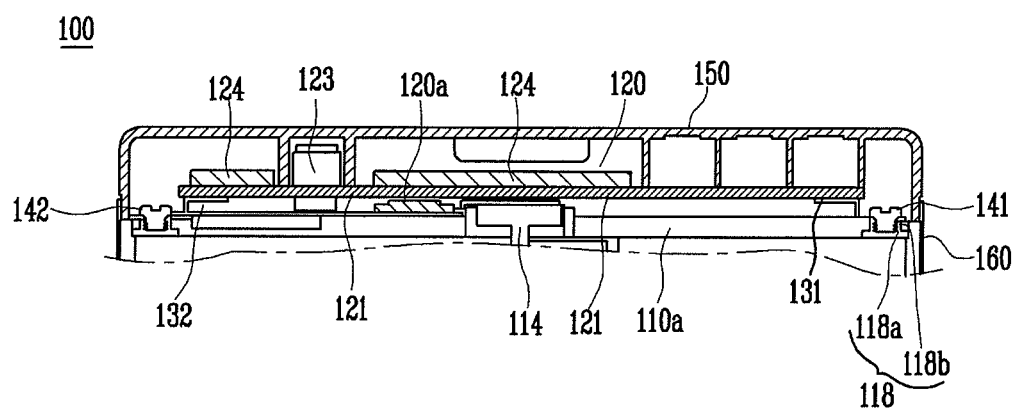
FIG. 7 is a sectional view illustrating an enlarged periphery of the fixing body of FIG. 6.

FIGS. 6 and 7 are partial sectional views illustrating an exploded battery pack according to another embodiment of the present invention.

As illustrated in FIGS. 6 and 7, the battery pack 100 according to another embodiment of the present invention can include the bare cell 110 and the protective circuit board 120. According to the present embodiment, since the bare cell 100 and the protective circuit board 120 are described above, description thereof will be omitted. Therefore, according to the present embodiment, the peripheries of coupling units 118 and 119 formed in the cap plate 110a will be described in detail.

As illustrated in FIGS. 6 and 7, the cap plate 110a may include the coupling units 118 and 119 made of different materials from the material of the cap plate 110a in the region where the fixing bodies 141 and 142 are coupled with the cap plate 110a. In the battery pack 100 including the coupling units 118 and 119, when the metal lead taps 131 and 132 soldered to the protective circuit board 120 are coupled to the cap plate 110a by the fixing bodies 141 and 142, although external shock is applied, the internal resistance between the bare cell 110 and the protective circuit board 120 increases or the cover case 150 is not separated.

To be specific, as illustrated in FIG. 7, the coupling unit 118 made of a different material from the material of the cap plate 110a is provided in the region where the cap plate 110a made of aluminum may be coupled to the fixing body 141 so that it is possible to prevent aluminum from collapsing as the coupling unit 118 is fastened to the fixing body 141.

The coupling units 118 and 119 are made of different materials from the material of the cap plate 110a and may be made of a material having higher strength than aluminum, such as nickel. Therefore, the coupling unit 118 made of a material having higher strength than aluminum may be provided in the region where the metal lead tab 131 is coupled to the cap plate 110a by the fixing body 141 so that the reliability of the battery pack 100 is improved.

In addition, as illustrated in FIG. 7, the coupling unit 118 can include a head unit 118a and a rod unit 118b extended from the head unit. The coupling unit 118 may be pressed and inserted from the lower part to the upper part of the cap plate 110a and sealed as to not protrude to the outside of the cap plate 110a. In addition, the rod unit 118b may include a groove opened upward to be coupled to the fixing body 141. In addition, the lower diameter of the rod unit 118b may be larger than the upper diameter.

While the present invention has been described in connection with certain embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:
1. A battery pack, comprising:
a bare cell including a can, wherein the can includes an opening on one side, and a cap plate sealing the opening of the can, wherein the cap plate has at least one groove formed on one surface;
a circuit board including at least one lead tab, wherein the lead tab is coupled to the cap plate by a fixing body; and
a coupling member having an upper surface and positioned within the at least one groove of the cap plate so that the upper surface of the coupling member does not protrude from the at least one groove above the cap plate wherein the coupling member defines an opening that receives the fixing body to be coupled with the fixing body in the groove opening of the coupling member wherein the opening in the coupling member begins at the level of the cap plate and is recessed below the cap plate wherein the coupling member has a head unit that directly contacts a lower surface of the cap plate and a rod unit that passes through the cap plate,
wherein the coupling member and a portion of cap plate surrounding the at least one groove of the bare cell are made of different materials, the coupling member is made of a material having higher mechanical strength than aluminum, and a lower diameter of the rod unit is larger than an upper diameter of the rod unit.
2. The battery pack as claimed in claim 1, wherein the coupling member is made of nickel.

3. The battery pack as claimed in claim 1,
wherein the at least one groove formed in the cap plate comprises a first groove and a second groove,
wherein the fixing body comprises a first fixing body coupled to the first groove and a second fixing body coupled to the second groove, and
wherein the coupling member comprises a first coupling member coupled to the first fixing body and a second coupling member coupled to the second fixing body.

4. The battery pack as claimed in claim 1, wherein the rod unit extended from the head unit.

5. The battery pack as claimed in claim 4, wherein the coupling member is coupled so that the head unit contacts the lower surface of the cap plate and that the rod unit is coupled to pass through the cap plate.

6. The battery pack as claimed in claim 4, wherein the rod unit comprises a groove opened upward to be coupled to the fixing body.

7. The battery pack as claimed in claim 1, wherein the fixing body is a screw bolt.

8. The battery pack as claimed in 1, wherein sealing members are formed on both sides of the groove of the cap plate to seal the coupling member.

9. A battery pack, comprising:
a bare cell including a can and a cap plate; and
a circuit board including a lead tab, wherein the lead tab is coupled to the cap plate by a fixing body,
wherein the cap plate having a groove which includes a coupling member having an upper surface and positioned within the groove so that the upper surface of the coupling member does not protrude from the groove above the cap plate wherein the coupling member defines an opening that engages with the fixing body and is positioned in the cap plate in a region where the fixing body is coupled to the cap plate wherein the opening of the coupling member is recessed below the cap plate, and a portion of the cap plate adjacent the coupling member and the coupling member are made of different materials wherein the material of the coupling member being stronger than the material of the cap plate wherein the coupling member has a head unit that directly contacts a lower surface of the cap plate and a rod unit that passes through the cap plate, wherein the coupling member is made of a material having higher mechanical strength than aluminum, and a lower diameter of the rod unit is larger than an upper diameter of the rod unit.

10. The battery pack as claimed in claim 9, wherein the coupling member is made of nickel.

11. The battery pack as claimed in claim 9,
wherein the fixing body comprises a first fixing body and a second fixing body, and
wherein the coupling member comprises a first coupling unit coupled to the first fixing body and a second coupling unit coupled to the second fixing body.

12. The battery pack as claimed in claim 9, wherein the rod unit extended from the head unit.

13. The battery pack as claimed in claim 12, wherein the coupling unit is inserted from a lower part to an upper part of the cap plate and sealed such that the coupling unit does not protrude to an exterior of the cap plate.

14. The battery pack as claimed in claim 12, wherein the rod unit comprises a groove opened to be coupled to the fixing body.

15. The battery pack as claimed in claim 9, wherein the fixing body is a screw bolt.

* * * * *